United States Patent [19]

Faris

[11] 4,009,303
[45] Feb. 22, 1977

[54] METHOD FOR POLISHING PORTIONS OF VEHICLE SURFACES

[76] Inventor: Theodore P. Faris, 21720 Corsaut, Birmingham, Mich. 48010

[22] Filed: Feb. 9, 1976

[21] Appl. No.: 656,750

Related U.S. Application Data

[62] Division of Ser. No. 556,002, March 6, 1975, abandoned.

[52] U.S. Cl. .................................. 427/287; 134/6; 427/368
[51] Int. Cl.² .......................................... B60S 3/06
[58] Field of Search ................. 134/6, 18; 15/53 A, 15/97 B, DIG. 2; 427/368, 287, 444; 118/110, 112, 114, 115

[56] References Cited

UNITED STATES PATENTS

| | | | |
|---|---|---|---|
| 3,037,223 | 6/1962 | Lovsey | 15/97 B X |
| 3,336,622 | 8/1967 | Kullwitz et al. | 15/53 A |
| 3,495,287 | 2/1970 | Freimanis | 15/53 A |
| 3,706,109 | 12/1972 | Bevier | 15/53 A |
| 3,774,259 | 11/1973 | Genaro | 15/97 B |
| 3,822,429 | 7/1974 | Thompson | 15/53 A |

Primary Examiner—S. Leon Bashore
Assistant Examiner—Richard V. Fisher
Attorney, Agent, or Firm—Basile, Weintraub and Vanophem

[57] ABSTRACT

Method for polishing a stationary vehicle comprising a mobile carriage that travels on wheels along longitudinally disposed tracks located on either side of the vehicle. The carriage supports opposing side polishing brushes rotatably mounted about laterally movable vertical axes to buff the vertical surfaces of the vehicle. An overhead brush rotatably mounted on a horizontal axis is movable in a vertical direction to polish the upper surfaces of the vehicle. The vehicle surfaces are coated with a wax or other suitable polishing materials, and the carriage with the rotating brushes is reciprocated back and forth relative to the stationary vehicle such that the vehicle surfaces are polished by the action of the rotating brushes.

1 Claim, 3 Drawing Figures

METHOD FOR POLISHING PORTIONS OF VEHICLE SURFACES

This is a division of application Ser. No. 556,002 filed Mar. 6, 1975, now abandoned.

BACKGROUND OF THE INVENTION

I. Field of the Invention

The present invention relates to apparatus and methods for automatically polishing a stationary vehicle.

II. Description of the Prior Art

Polishing surfaces such as the finished surfaces of automobiles necessitates the application of a polish, wax, or cleaner to the surface and subsequently removing the residue. As used herein "polish" means any polish, wax, cleaner, or similar substance or combinations thereof. As is well known, the polish removal stage should include sufficient frictional contact between the polishing medium and the vehicle surface to allow for a proper buff or polish. On large surfaces, such as the surfaces of the body of an automobile and other vehicles, the conventional manner of manually applying the wax and removing the same has considerable limitations due to the physical strength and stamina of the person hand polishing a surface; and thus such manual hand polishing is limited on a large-scale commercial basis. Althoufh hand-held machines for applying and removing polish may somewhat reduce human labor and increase the speed of the operation, the use of such hand-held machines requires considerable skill in order to prevent damage to a finished surface. For example, such devices which generally comprise a rotating or vibrating pad tend to trap heat against the surface, and thus the operator must use just enough pressure for a sufficient time to effect the polished surface as too much surface contact or too much polishing spent at a particular area may result in damage to the finish of the vehicle surface. Thus, as in a purely manual operation, the human labor factor is still too great and the speed too slow for economical large-scale commercial polishing operations.

Automatic car washing systems are well known, and numerous ways have been devised to wash and dry vehicles including the use of strategically spaced water spray nozzles, brushes, blowers, and sophisticated mechanical and electrical controls therefore. Some automobile car washing systems are also equipped to spray liquid wax, or polish, onto the vehicle during the operation. These so-called waxing operations do not use any frictional contact in applying the material or removing the residue, and as such both the application and removal of the polish are inadequate. In such car washing systems rotating washing brushes are used, but such rotating brushes, or pads, do not achieve an optimum result as the brushes tend to cause scratches and localized overheating of the vehicle surface with the subsequent damage to the finish. Examples of car washing apparatus which apply wax during the process of washing the car are disclosed in the U.S. Pat. No. 3,447,505 and in the U.S. Pat. No. 3,795,929.

An automatic surface polishing system is disclosed in the U.S. Pat. No. 3,774,259 as comprising a plurality of longitudinally spaced polishing apparatus through which the vehicle to be polished is driven at a predetermined rate in order to permit the brushes carried by the mechanism to polish the vehicle as the same moves by the mechanism. In such systems the vehicle to be polished is moved on a conveyorized path through the stationary polishing installations, and such systems require a considerable amount of space and are expensive to initially install and, in particular, their adaptation to the conventional service station requires the construction of additional space as the physical limits of the existing facility simply cannot handle the required length of such a conveyorized system.

It would therefore be desirable to provide an automatic surface polishing system especially adapted to polish large surfaces, such as those of automobiles, with the same being done quickly and uniformly without damage to the finish all of which can be accomplished in a limited sized facility and on an economical basis which lends itself to large-scale polishing operations.

SUMMARY OF THE INVENTION

The present invention which will be described subsequently in greater detail comprises an apparatus and method for polishing a vehicle comprising a carriage which has rotating buffer brushes and which is movable back and forth upon a pair of spaced tracks separated a sufficient distance to define an area within which a vehicle may be positioned. The appropriate surfaces of the vehicle are coated with a suitable polish after which the carriage is passed back and forth over the vehicle while the brushes contact the vehicle to polish the surfaces thereon.

It is therefore an object of the present invention to provide a new and improved automatic polishing apparatus and a method of polishing a vehicle wherein the vehicle remains stationary throughout the entire polishing operation.

It is another object of the present invention to provide such a vehicle polishing apparatus and method which is inexpensive in cost, of dependable operation for a substantial period of time, and one which is economical for large-scale polishing commercial operations.

Other objects, advantages, and applications of the present invention will become apparent to those skilled in the art of apparatus and methods for polishing vehicles when the accompanying description of one example of the best mode contemplated for practicing the invention is read in conjunction with the accompanying drawing.

BRIEF DESCRIPTION OF THE DRAWING

The description herein makes reference to the accompanying drawings wherein like reference numerals refer to like components throughout the several views, and in which.

DESCRIPTION OF THE PREFERRED EMBODIMENT

Figure 1:
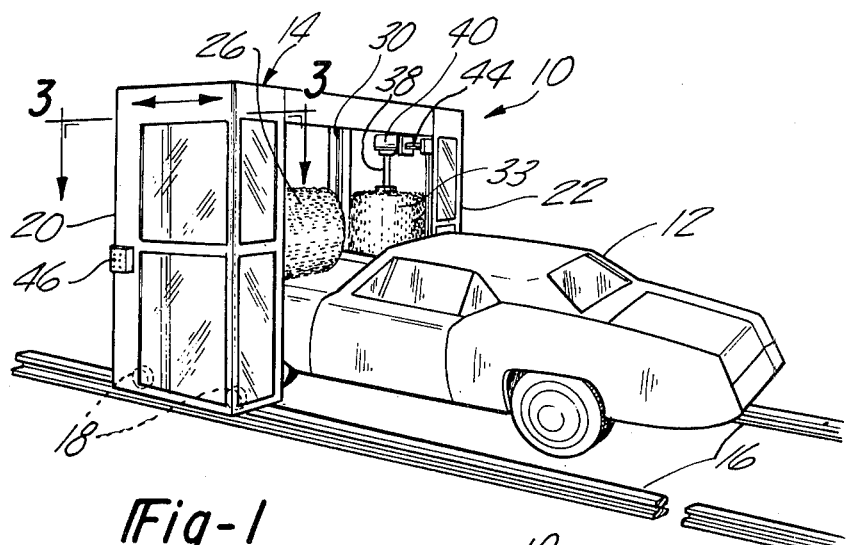
FIG. 1 is a perspective view of one example of an apparatus employing the inventive method for polishing a vehicle.

Referring now to the drawing and, in particular, to FIG. 1 wherein there is illustrated a car polishing apparatus 10 used to perform the inventive method of polishing a vehicle 12. The vehicle polishing apparatus 10 comprises a traveling carriage, or gantry, structure 14 designed to move over parallel tracks 16 which are located lengthwise along the floor of the polishing facility such as the service bay of a typical gasoline station. Wheels 18 are rotatably affixed to the carriage 14 by suitable axles to permit the travel of the carriage 14 along the tracks 16. The wheels 18 are preferably located at the four-corner locations of the carriage 14 to provide stability to the structure. Suitable motor and drive means are connected to the wheels 18 to rotate the wheels 18 in opposite directions so that the carriage 14 may be reciprocated along the longitudinal length of the track 16 in a manner to be described hereinafter.

The carriage 14 comprises generally an inverted U-shaped frame designed to be disposed adjacent and above the centrally disposed vehicle 12 which is desired to be polished. When the vehicle 12 is located in a polishing facility, the carriage 14 is initially disposed forward of the front end of the vehicle 12.

Figure 2:
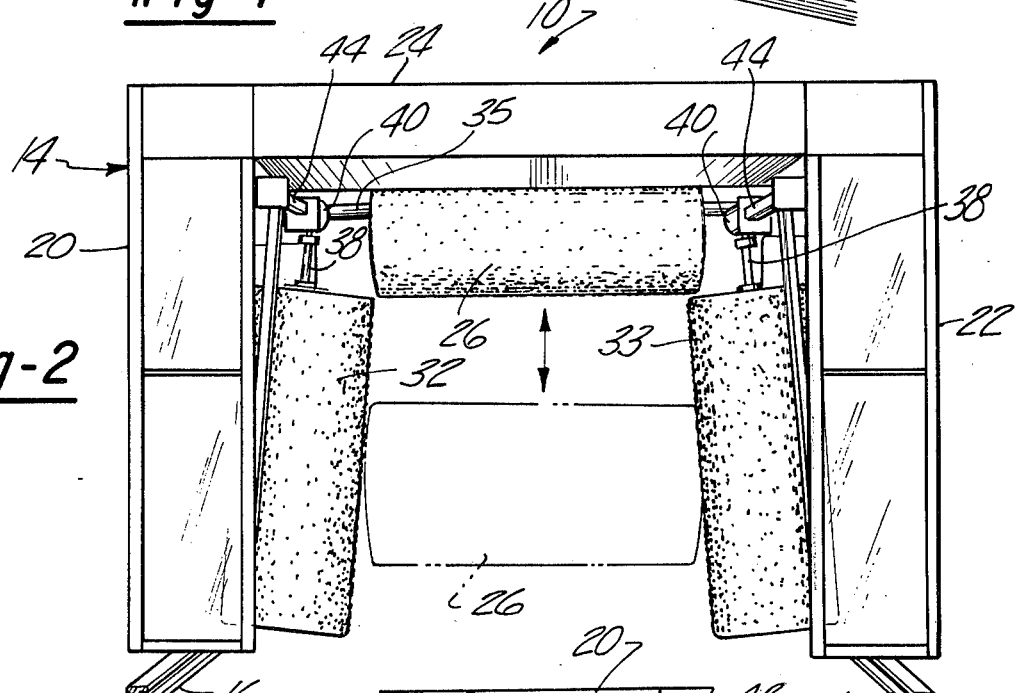
FIG. 2 is a front elevational view of the apparatus illustrated in FIG. 1.

The carriage 14 comprises opposed upright, or vertical, column members 20 and 22 and an overhead connecting member 24. The upright and overhead members are provided with sufficient structural horizontal and vertical beam members to connect the members of the carriage 14 to one another so that it is of sufficient rigidity and strength for providing the desired function of polishing the vehicle 12 in a manner to be described. The carriage 14 further comprises an horizontal polishing bursh 26 which is rotatable about an axle that is vertically displaceable in track members 30 (FIG. 1) carried on the opposing inner wall of the upright members 20 and 22. Suitable motoring means (not shown) raise and lower the horizontal polishing brush 26 (FIG. 2) such that the brush 26 will remain in contact with the upper surfaces of the vehicle 12 while the carriage 14 passes thereover.

Figure 3:
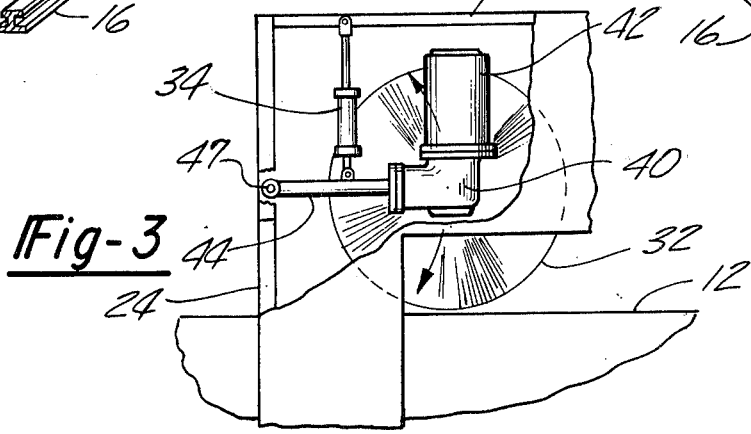
FIG. 3 is a fragmentary partially sectioned top view of the apparatus as seen along line 3—3 of FIG. 1.

Vertical polishing brushes 32 and 33 are carried, respectively, by the upright members 20 and 22 such that the lower ends of the vertical brushes 32 and 33 are pivotally attached to the upright members. When a suitable actuator, such as a hydraulic cylinder 34 (FIG. 3) associated with the upper end of each vertical brush 32 and 33, is actuated the upper end of each brush is tilted toward the vehicle 12 such that the brushes 32 and 33 come into contact with the vertical side surfaces of the vehicle 12. The upper ends of each of the brushes 32 and 34 are illustrated as comprising a shaft or axle 38 which is attached to a coupling mechanism 40 which, in turn, functions to couple its associated brush to a suitable motor such as an electric motor 42 which rotates its associated brush about its vertical axis. A portion of the coupling mechanism 40 is attached to a connecting shaft 44, the end of which is pivotally attached to the upright member as shown at 47 in FIG. 3 while an intermediate portion of the connecting shaft 44 is attached to the aforementioned hydraulic cylinder 34. When the hydraulic cylinder 34 is expanded, the shaft 44 is rotated so as to move the brushes toward the car and when the hydraulic cylinder 34 is retracted, the brushes are moved away from the car. While only the aforementioned components are illustrated in FIG. 3 as being associated with the brush 32, it should be understood that the brush 33 has comparable components which function to operate in the same manner as the bursh 32 components as well as to function simultaneously therewith.

The horizontal brush 26 is rotatably mounted on a shaft 35 which is driven by a motor similar to the motor 42 while a chain-type drive (not shown) may be provided to raise and lower the rotating horizontal brush 26.

The polishing brushes 26, 32, and 33 are of similar construction and may comprise strips of flexible material that are attached to a rotating drum at spaced intervals about the drum's periphery. The material, preferably, should be closely interwoven or matted material, such as natural or synthetic fabric and should preferably have a resilient backing.

In use the vehicle 12 is parked between the longitudinally disposed track 16 as shown in FIG. 1 of the drawing with the carriage 14 being positioned in front of the vehicle. Wax is then manually applied to those portions of the vehicle surface which are desired to be polished, obviously not applying wax to the windows of the cars as such components are not normally waxed. After the wax has been applied and permitted to dry for a sufficient time, as necessary, the apparatus 10 is actuated by suitable control means 46 so as to actuate the motors driving the wheels 18 and to commence rotation of the polishing brushes 32, 33, and 26. Suitable sensing means permit the brushes to move inwardly toward the vertical sides of the vehicle and toward the upper surface of the vehicle such that the brushes will come into contact with the vehicle with the proper pressure and commence polishing the vehicle surfaces under the action of the rotating brushes. As the carriage moves along the track 16, the rotating brushes will come into contact with all of the vertical and upper surfaces of the vehicle to effect polishing. Suitable sensing devices carried by the apparatus 10 will indicate that the apparatus has reached the end of the automobile, and the motor driving the wheels 18 will be reversed by any suitable control circuitry to cause the carriage to move from the rear of the vehicle 12 to the front of the vehicle 12. This cycle of reciprocally moving the carriage back and forth from the front to the rear and from the rear to the front of the vehicle 12 will continue until a visual inspection of the vehicle 12 indicates that it has been sufficiently polished at which time the apparatus may be turned off by utilizing the appropriate switch on the control box 46.

While it was indicated hereinbefore that the wheels 18 are preferably located at the four-corner locations of the carriage 14 to provide stability to the structure, it should also be noted that the wheels can be located at the upper four corners of the carriage 14 and the carriage can then be suspended from an overhead pair of longitudinally disposed rails.

It should also be noted that the control box 46 contains a variable speed control which controls the back and forth speed of the gantry. This speed is varied depending upon the condition of the automobile finish such that a proper polishing of the vehicle finish may be obtained.

It can thus be seen that the present invention has provided an apparatus and method for polishing vehicles wherein the apparatus is mounted on tracks for travel forward and back over a stationary vehicle and will accommodate virtually any passenger vehicle.

Although only one form of the present invention has been disclosed, it should be understood by those skilled in the art of polishing vehicles that other forms can be had all coming within the spirit of the invention and the scope of the appended claim.

What is claimed is as follows,

I claim:

1. A method of polishing a vehicle having windows within an apparatus of the type having a pair of longitudinally disposed tracks spaced apart a sufficient distance to define an area in which the vehicle may be positioned; a carriage having a pair of upright members respectively movably mounted on said tracks and an overhead member connecting said upright members to define an opening thereinbetween of sufficient size to permit the carriage to pass over the vehicle disposed in said area; means for reciprocally moving said carriage on said tracks longitudinally at a selected speed; first rotating brushes carried by said upright members and displaceable relative to the vertical exterior surface of the vehicle disposed in said area; a second rotating overhead brush carried by said carriage and displaceable relative to the upper exterior surface of a vehicle disposed in said area; and means displacing said rotating first and second brushes into contact with the vertical and upper exterior surfaces of the vehicle as said carriage is reciprocally moved relative to the vehicle disposed in said area;

said method comprising the steps of:

a. manually applying polish to selected portions of at least one exterior surface of the vehicle which is desired to be polished and not applying wax to the windows of the vehicle;

b. permitting the polish to dry for a selected period of time;

c. positioning the vehicle in the area defined between the longitudinally disposed tracks;

d. selecting the speed at which said carriage will reciprocate on said tracks;

e. passing the carriage back and forth along said vehicle such that said rotating brushes simultaneously contact the vertical and upper exterior surfaces of the vehicle while the vehicle is in a stationary position, the rotating brushes being passed front to rear and rear to front of the vehicle to polish said one exterior surface;

f. terminating said reciprocating movement of said carriage and terminating the contact of the brushes with the vehicle exterior surfaces after said one exterior surface has been polished; and g. removing said polished vehicle from said area.

* * * * *